W. T. HUTCHISON.
PLOW.
APPLICATION FILED AUG. 11, 1913.
1,240,047.
Patented Sept. 11, 1917.
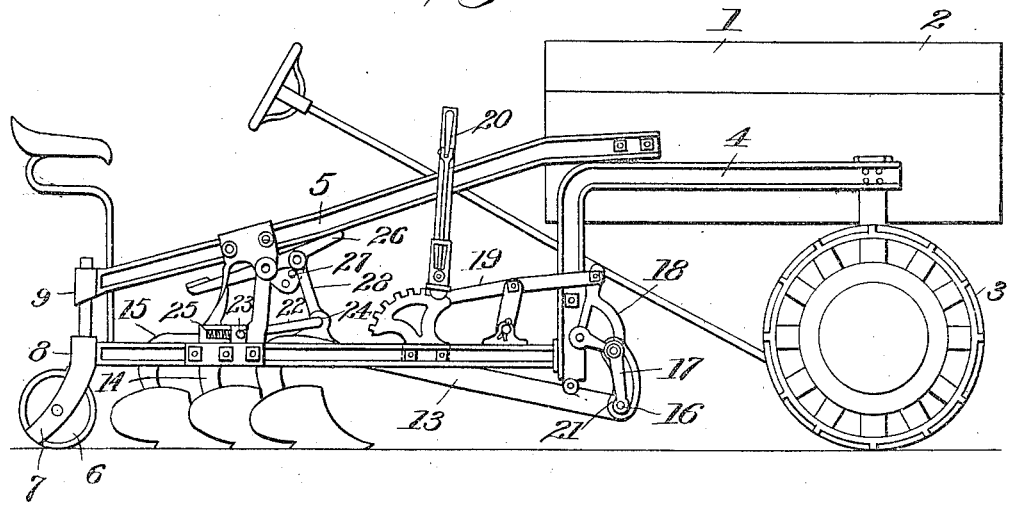
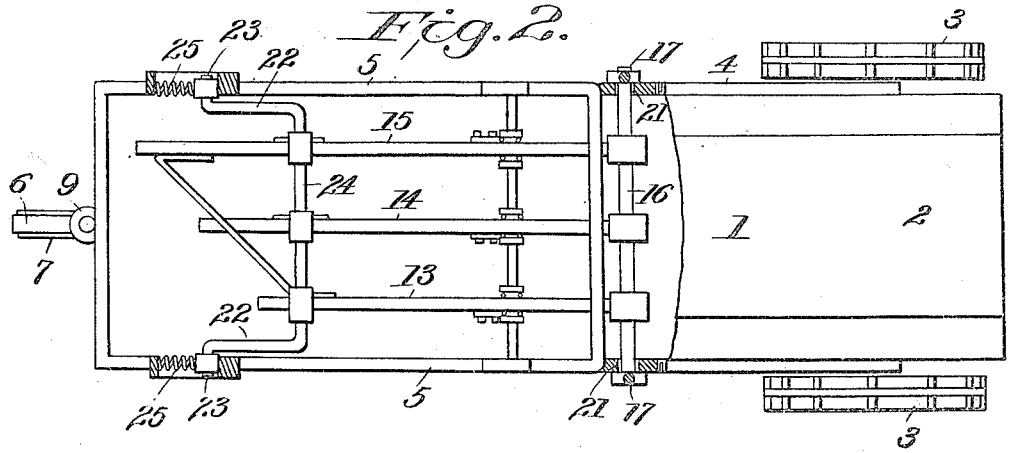
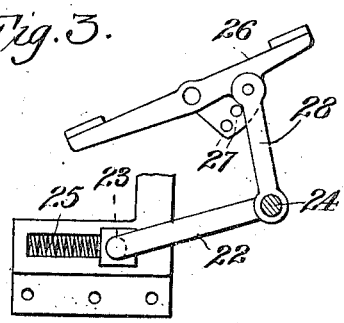
Inventor
Wm T. Hutchison
By
Attorney

UNITED STATES PATENT OFFICE.

WILLIAM T. HUTCHISON, OF SOUTH BEND, INDIANA.

PLOW.

1,240,047.  Specification of Letters Patent.  Patented Sept. 11, 1917.

Application filed August 11, 1913. Serial No. 784,131.

*To all whom it may concern:*

Be it known that I, WILLIAM T. HUTCHISON, a citizen of the United States, residing at South Bend, in the county of St. Joseph and State of Indiana, have invented a new and useful Improvement in Plows, of which the following is a specification.

This invention relates to farming implements.

The object of the invention resides in the provision of a farming implement, embodying among other characteristics, a plow frame adapted to be connected to a motor driven vehicle or which may be propelled in any suitable manner and wherein the plow beams of the implement, together with their earth-working devices, are held normally in inoperative position, but which may be easily and quickly operated to depress the earth-working devices into contact with the ground to work the latter.

With the above recited objects in view, and others of a similar nature, the invention consists in the construction, combination, and arrangement of parts hereinafter set forth and falling within the scope of the appended claims.

Figure 1 is a side elevation of the invention;

Fig. 2 is a top plan view;

Fig. 3 is a fragmentary elevation of the foot operating means for depressing the plow beams and their earth-working devices.

Similar figures refer to similar parts in the different views.

1 and 2 are the engine-hood and radiator respectively. 3 are the drive wheels, and 4 and 5 are the main parts of the engine and plow frame, while 6 is a caster-wheel, and 7 a caster-wheel frame. 8 and 9 are castings making a pivoted connection of said caster-wheel to main frame. 13, 14 and 15 are the plow beams, which are connected at their front ends to a cross-bar 16. Links 17, angles 18, and straps 19, make connection from said cross-bar 16, to lever 20, said lever being used to control the vertical adjustment of said cross-bar and beams, which are guided by an arch opening in guides 21, which are securely fastened to the main frame. 22 is a bail connected with the main plow frame at 23, and connected to the plow beams at 24, and the compression spring 25 allows the bail ends 23 to give longitudinally in the vertical action of the plows. 26, 27 and 28 are parts forming a foot control for lowering and raising the plow into and out of the ground. 27 is an arcuate member with a number of holes for adjustment of the arm 28 to obtain different depths of furrows. 29 makes connection from the arm 28 to the plow-beams 13, 14 and 15. 30, 31 and 32 combined form a subsidiary frame used in combination with the forward portion of the main frame for making a farm motor. In converting the traction plow into a farm tractor all that is necessary to do is to disconnect the members 5 of the plow frame from the members 4 of the tractor engine frame, and connect the frame members 30, 31 and 32, of the auxiliary frame to said frame members 4 and substitute a short steering rod for the long rod shown in Fig. 1.

The auxiliary plane 33, is provided with bearings (not shown) for the member 34, to which the frame 7, is attached.

While I have herein shown and described one particular form of my invention, by way of illustration, I desire it to be understood that I do not confine myself to all the precise details of construction herein delineated, as modification and variation may be made without departing from the spirit of the invention or exceeding the scope of the appended claims.

Having thus described the invention, what is claimed as new is:—

1. In a device of the character described, a frame, a cross bar slidably mounted on the frame, plow beams connected to said cross bar, earthworking devices carried by the plow beams, a lever on the frame, connections between the lever and cross bar to adjust the latter and the beams vertically, bearings on the plow frame adjacent the rear end of the latter, a spring in each bearing, an element extending transversely of the frame and connected to the beams and having its ends mounted in said bearings and controlled by said springs so as to support the earth-working devices of the plow beams normally out of contact with the ground, and means for depressing the rear ends of the plow beams to throw the earth-working devices into contact with the ground.

2. In a device of the kind described, in combination, a plow, a frame upon which said plow is mounted, a bearing on said frame, said bearing having a longitudinal slot, a pin working in said slot, an expansible spring in said slot to which said pin is connected, a pivot on said bearing, a bell-crank mounted on said pivot, said bell-crank being pivotally secured to said plow to depress the same, and a rod connected respectively to said pin and to said plow.

3. In a device of the character described, a plow frame, a cross bar slidably mounted at the forward end of the frame, a plow connected at its forward end to said cross bar, a lever pivoted on the frame, connections between the lever and the cross bar whereby on movement of the lever the forward end of the plow beam and said cross bar may be adjusted vertically, a bearing member on the plow frame adjacent the rear end of the latter, a spring in the bearing having connection with said plow beam and coöperating with the connection of the beam with said cross bar to support the plow normally out of contact with the ground, and means for depressing the rear end of the plow beam to throw the plow into contact with the ground.

WILLIAM T. HUTCHISON.

Witnesses:
S. H. YANCEY,
GEO. KENNEDY.

Copies of this patent may be obtained for five cents each, by addressing the "Commissioner of Patents, Washington, D. C."